(12) United States Patent
Dunne et al.

(10) Patent No.: US 7,495,876 B2
(45) Date of Patent: Feb. 24, 2009

(54) CIRCUIT BREAKER INTEGRAL TEMPERATURE MONITORING FOR ADVANCE DETECTION OF DEFECTIVE POWER CONDUCTOR CONNECTIONS

(75) Inventors: David J. Dunne, Cedar Rapids, IA (US); Robert A. Kennedy, Murfreesboro, TN (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 11/811,611

(22) Filed: Jun. 11, 2007

(65) Prior Publication Data

US 2008/0013596 A1    Jan. 17, 2008

Related U.S. Application Data

(60) Provisional application No. 60/831,006, filed on Jul. 14, 2006.

(51) Int. Cl.
*H02H 5/04* (2006.01)
*H02H 9/00* (2006.01)

(52) U.S. Cl. .................. 361/103; 361/106; 361/57

(58) Field of Classification Search ............. 361/103, 361/106, 57
See application file for complete search history.

(56) References Cited

U.S. PATENT DOCUMENTS

| | | | | |
|---|---|---|---|---|
| 5,198,956 | A | * | 3/1993 | Dvorak ................. 361/106 |
| 5,835,320 | A | * | 11/1998 | Palmieri et al. .......... 361/106 |
| 2006/0119344 | A1 | * | 6/2006 | Benke et al. ............. 324/126 |

OTHER PUBLICATIONS

National Semiconductor brochure entitled "LM75 Digital Temperature Sensor and Thermal Watchdog with Two-Wire Interface" (18 pages)—(Oct. 2005) (from www.national.com website).

\* cited by examiner

*Primary Examiner*—Stephen W Jackson
*Assistant Examiner*—Dharti H Patel

(57) ABSTRACT

A circuit breaker includes a breaker enclosure, a plurality of conductor connections, and a temperature sensor. The breaker enclosure contains internal components that include a trip unit. The plurality of conductor connections electrically couple the trip unit to a plurality of power conductors. The temperature sensor is located to sense heat radiated by the conductor connections and is positioned inside the enclosure.

16 Claims, 3 Drawing Sheets

CIRCUIT BREAKER INTEGRAL TEMPERATURE MONITORING FOR ADVANCE DETECTION OF DEFECTIVE POWER CONDUCTOR CONNECTIONS

CROSS-REFERENCE TO RELATED APPLICATION

The present application claims the benefit of U.S. Provisional Application Ser. No. 60/831,006, filed Jul. 14, 2006, titled: "Motor Circuit Protector," and hereby incorporates that application by reference in its entirety.

FIELD OF THE INVENTION

This invention is directed generally to electrical power distribution equipment, and, more particularly, to a circuit breaker having a sensor device for sensing the temperature of the circuit breaker's power conductor connections.

BACKGROUND OF THE INVENTION

Circuit breakers are well known in the art, and are designed to trip in response to an electrical interruption event caused by an overload, short circuit, or thermal runaway condition, thereby opening the circuit to which the circuit breaker is connected and reducing the possibility of damage to the conductor wires or the loads connected to the circuit breaker. A circuit breaker can be reset (either manually or automatically) to resume power flow to the loads.

Typically, power conductors are connected to a circuit breaker through mechanical pressure via, e.g., screw-type or compression lugs. Although the circuit breakers themselves normally provide reliable protection for many years, the mechanical connections holding the power conductors can loosen, resulting in higher circuit impedance, higher temperatures, and possibly damage to insulation or even fire hazards. Preventive maintenance techniques include manual inspection testing with infrared sensing equipment for diagnosing loose connections and/or defective bus joints before problems occur in electrical distribution equipment (e.g., switchgear, panelboards, motor control centers, etc.). Such testing involves the expense of the service itself and, additionally, has the disadvantage that, due to its periodic nature, some potential problems may not be detected in a timely fashion.

What is needed, therefore, is a circuit breaker having a device for sensing the temperature of the circuit breaker's power conductors.

SUMMARY OF THE INVENTION

In an implementation of the present invention, a circuit breaker includes a breaker enclosure, a plurality of conductor connections, and a temperature sensor. The breaker enclosure contains internal components that include a trip unit. The plurality of conductor connections electrically couple the trip unit to a plurality of power conductors. The temperature sensor is located to sense heat radiated by the conductor connections and is positioned inside the enclosure.

In an alternative implementation of the present invention, a method provides a circuit breaker for sensing temperature at a conductor connection. The method includes enclosing internal components, including a trip unit, of a circuit breaker with a protective breaker enclosure. The method also includes providing a plurality of conductor connections for electrically coupling the trip unit to a plurality of power conductors. The method further includes mounting a temperature sensor inside the protective breaker enclosure to sense heat radiated by the conductor connections.

In another alternative implementation of the present invention, an electrical system includes an electrical distribution equipment system, a server, and a plurality of circuit breakers. The server is mounted in the electrical distribution equipment system and is communicatively coupled to a customer network. The circuit breakers are mounted in the electrical distribution equipment system and are communicatively coupled to the server. Each of the plurality of circuit breakers is electrically coupled to a plurality of power conductors. At least one circuit breaker includes at least one breaker lug and at least one temperature sensor. The breaker lug electrically couples the circuit breaker to a corresponding power conductor. The temperature sensor is positioned inside the circuit breaker and proximate to the breaker lug.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The invention may best be understood by reference to the following description taken in conjunction with the accompanying drawings, in which.

DETAILED DESCRIPTION OF THE ILLUSTRATED EMBODIMENTS

Although the invention will be described in connection with certain preferred embodiments, it will be understood that the invention is not limited to those particular embodiments. On the contrary, the invention is intended to include all alternatives, modifications and equivalent arrangements as may be included within the spirit and scope of the invention as defined by the appended claims.

A power equipment lineup contains one or more circuit breakers that include embedded data communications for communicating with facility data communications networks. The communication of data reduces expenses associated with the circuit breakers, including status monitoring, operation control, remote loading of meter circuits, and diagnosing power quality problems. Sensing temperature inside a circuit breaker, proximate to conductor connections, can quickly detect defective connections of power conductors, thus avoiding many serious consequences associated with loose or faulty connections. Accordingly, to avoid damage to equipment and personnel, the data communications transmits advance warning when loose or defective power conductor connections are detected.

One embodiment is directed generally to circuit breakers located within network-enabled electrical power distribution equipment, such as switchgear, switchboards, panelboards, motor control centers, control panels, and other similar equipment. In particular, one embodiment is related to circuit breakers having an integrated sensor for sensing the temperature of the power conductor connections, including load-side power conductor connections. Thus, the temperature of power conductor connections can be monitored in all circuit breakers and their associated power equipment enclosures, including medium voltage and low voltage switchgear, switchboards, panelboards and motor control centers. In one example, the temperature of power conductor connections can be monitored in SQUARE D® TRANSPARENT READY® web-enabled power equipment. In other examples, the temperature of power conductor connections can be monitored in circuit breakers that are installed in separate enclosures, in busways, and equipment enclosures provided by third-party customers ("OEMs").

The temperature monitoring of the conductor connections eliminates a need for expensive infrared scanning of equipment. Also, it eliminates a need to open equipment for physical access to connections just to check for temperature-related problems. The temperature monitoring of the conductor connections is a continuous event (not a periodic event) that results in faster detection of potential problems and, consequently, avoids equipment damage and increases safety of personnel.

Figure 1:
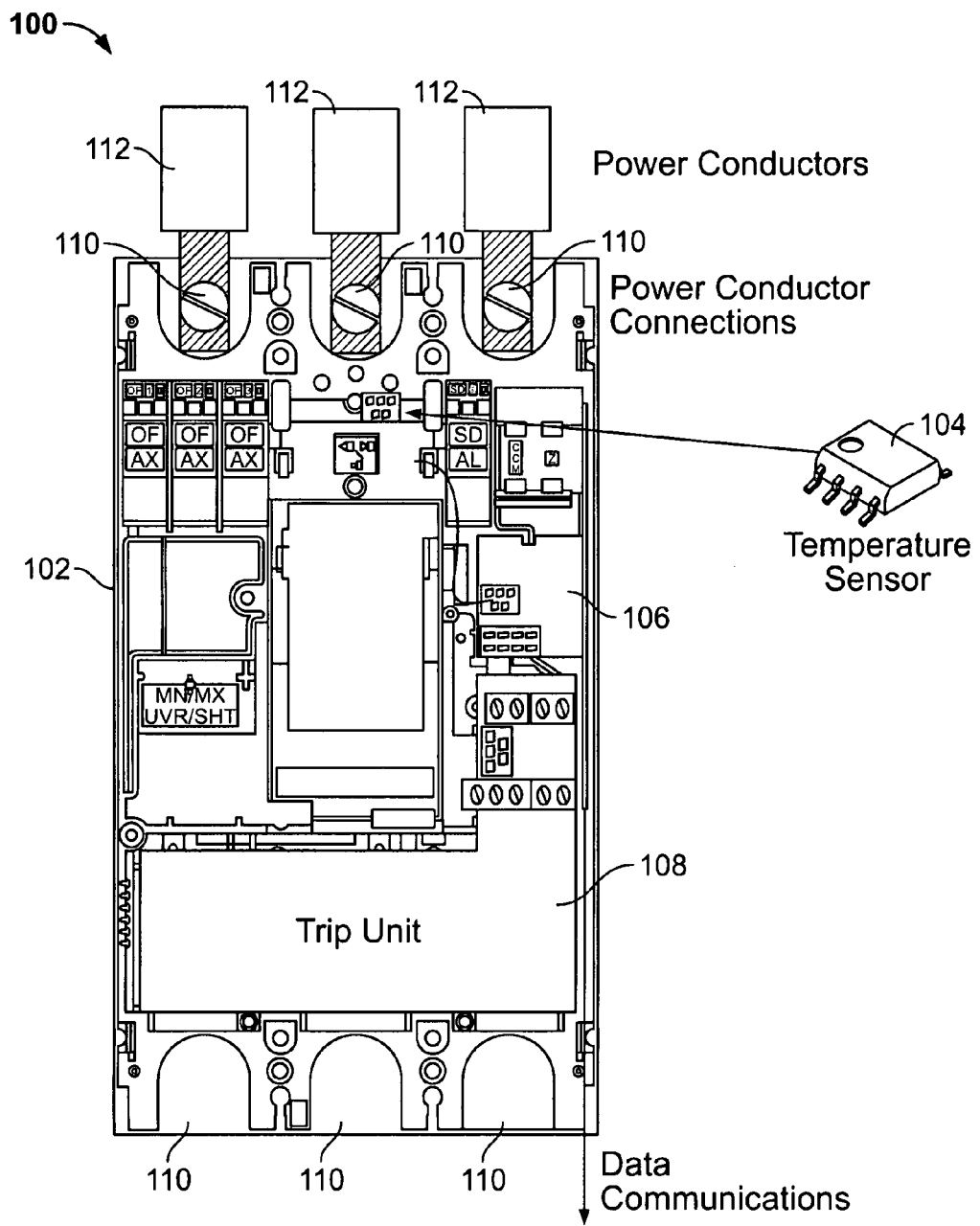
FIG. 1 is a planar view of a molded case circuit breaker having an embedded temperature sensor, according to another implementation of the invention.

Turning now to FIG. 1, a circuit breaker 100 has an enclosure 102 in which a plurality of internal components are mounted. The enclosure 102 is partially illustrated to show some of the internal components, including a temperature sensor 104, a controller 106, and trip unit 108. The enclosure 102 protects the internal components from damage, including damage related to environmental conditions. For example, the enclosure 102 protects the internal components from pollutants, high-heat generated by nearby electrical devices, adverse weather conditions, etc.

The circuit breaker further includes a plurality of conductor connections 110 that are generally located external to the enclosure 102. The illustrated circuit breaker 100, the conductor connections 110 are coupled, respectively, to a plurality of power conductors 112 for electrically coupling the trip unit 108 to a power load. The power conductors 112 can be, for example, a plurality of power cables. Although the conductor connections 110 (also referred to as power conductor connections) are illustrated as screw-in type lugs, the conductor connections 110 can be any type of connection. For example, the conductor connections 110 can be compression lugs, plug-in connections, etc. The conductor connections 110 can include load-side conductor connections or line-side conductor connections.

In general, the power conductors 112 should be tightly connected to the conductor connections 110 for ensuring proper functioning of the circuit breaker 100. If the power conductors 112 become loose, higher temperatures result from higher circuit impedance. Eventually, the circuit breaker 100 will likely fail to perform adequately and, worse, fire hazards may occur.

The temperature sensor 104 is mounted proximate to the conductor connections 110, near one end of the circuit breaker 100. The temperature sensor 104 senses, or detects, heat radiated by the conductor connections 110 when coupled to the power conductors 112. The temperature sensor 104 is communicatively coupled to the controller 106 for transmitting temperature data related specifically to power conductor connections. According to one embodiment, the temperature sensor 104 is an analog temperature sensor that outputs temperature data via an analog-to-digital converter, or other appropriate interface, to the circuit breaker's microprocessor-based controller 106. Optionally, more than one temperature sensor 104 can be mounted in the circuit breaker 100.

The controller 106 is communicatively coupled to the trip unit 108 and, optionally, to a data communication network. In an alternative embodiment, the controller 106 is located external to the enclosure 102. The data communication network can be a local network or a wide area network, such as the Internet.

Based on the temperature data received from the temperature sensor 104, the controller 106 can be programmed to instruct the trip unit 108 to take an appropriate action. For example, if the temperature data includes a temperature value that is greater than a maximum allowable temperature, the controller 106 can make a determination based on pre-defined algorithms to perform a tripping action (i.e., remove electrical contact between a movable contact and a stationary contact of the circuit breaker). In general, the pre-defined algorithms can distinguish between a normal temperature increase due to higher load currents and an abnormal temperature increase characteristic of a defective conductor connection.

Temperature values received from the temperature sensor 104 can be stored in a memory for future retrieval, or made available for immediate access via a data communications link. For example, the memory can be included in the controller 106 or can be separate from the controller 106.

As part of network-enabled power equipment, an end user can be notified via an alarm on a computer screen, an email alert, mobile phone text message, etc., that a particular condition has occurred. Accordingly, the controller 106 can be programmed to transmit data messages to the data communications network, and the user can conveniently retrieve the data messages via a remote system, such as a personal computer. The data messages can be emails forwarded from the Internet to a personal email account. The data messages can provide monitoring information regarding the temperature detected by the temperature sensor 104. For example, the data messages can include warning messages informing the user that the detected temperature has exceeded a normal temperature, although the detected temperature has not necessarily exceeded the maximum allowable temperature. Thus, the user can take appropriate action, such as manually tripping the circuit breaker or performing a maintenance test of the power conductor connections.

In an alternative embodiment, the temperature sensor 104 is a digital temperature sensor that is communicatively coupled to the controller 106 via a data communications interface, instead of analog signals. For example, the digital temperature sensor can be National Semiconductor Corporation's LM75 product, which includes a temperature sensor, an analog-to-digital converter, and a digital over-temperature detector with I²C® interface. Optionally, it may be possible to distinguish a current signature associated with a defective power conductor connection from a normal load condition through sophisticated waveform signature analysis.

Mounting the temperature sensor 104 internal to (in contrast to external to) the circuit breaker 100 greatly reduces cost and hazards associated with the installation and maintenance of the temperature sensor 104. For example, providing an external temperature sensor would be cost prohibitive at least in part because the external location would introduce additional hazards do to the sensor's proximity to power conductor conductors, which must be safely routed past the sensor. In fact, even if cost would be irrelevant, safety may always be a concern based on the inherent problem associated with mounting a temperature sensor unprotected (e.g., external to the circuit breaker) in close proximity to the power conductor connections.

Additionally, mounting the temperature sensor 104 proximate to the power conductor connections, in contrast to anywhere else inside the circuit breaker 100, provides accurate and safe monitoring of the power conductor connections' temperature. The proximity of the temperature sensor 104 to the conductor connections 110 increases accuracy in detection of power conductor connection defects and eliminates (or greatly reduces) temperature related to general environmental conditions.

Figure 2A:
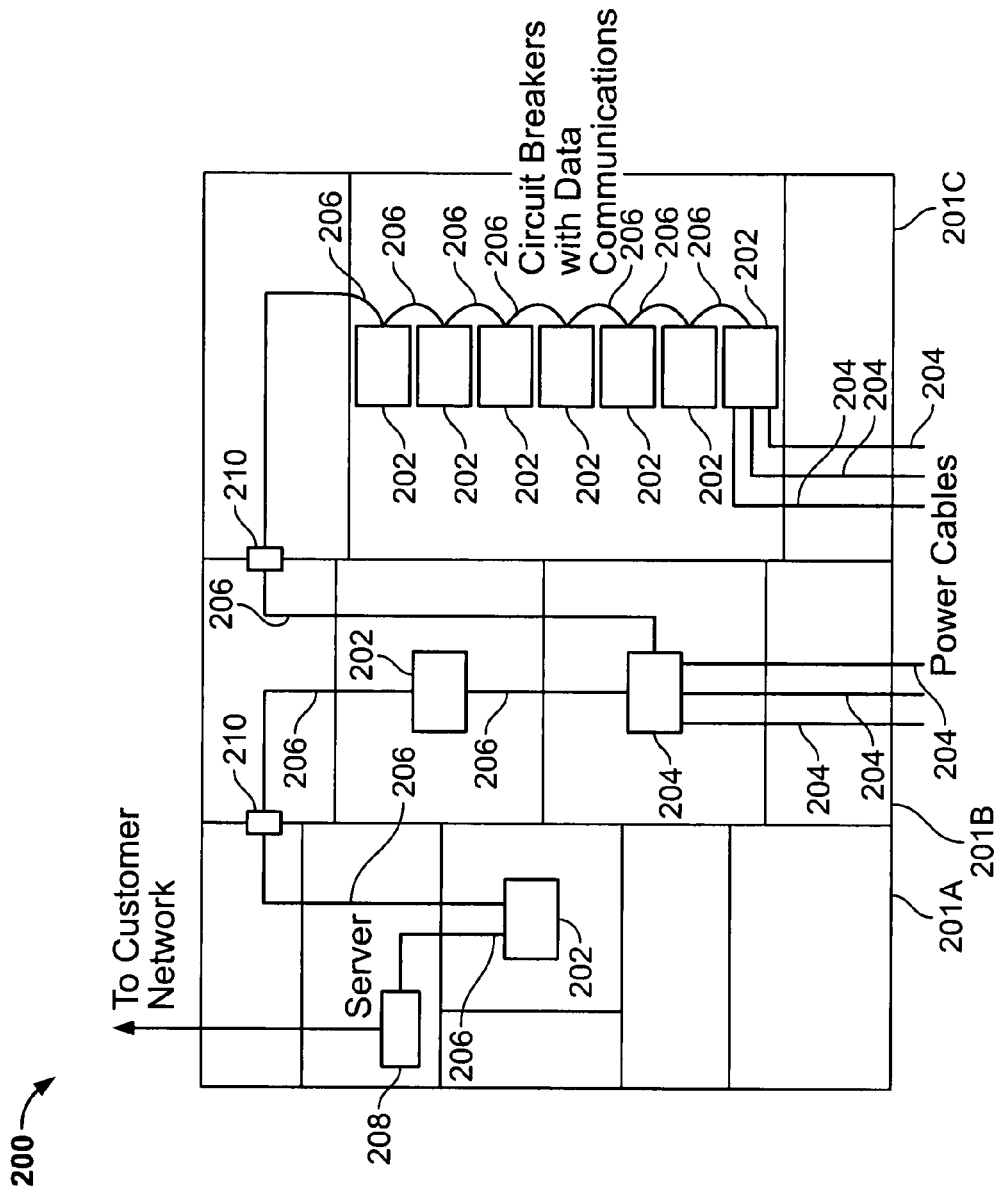
FIG. 2A is a diagram of a web-enabled electrical power equipment system illustrating a plurality of circuit breakers communicatively coupled to a central communications processor, according to an alternative implementation of the invention.
Figure 2B:
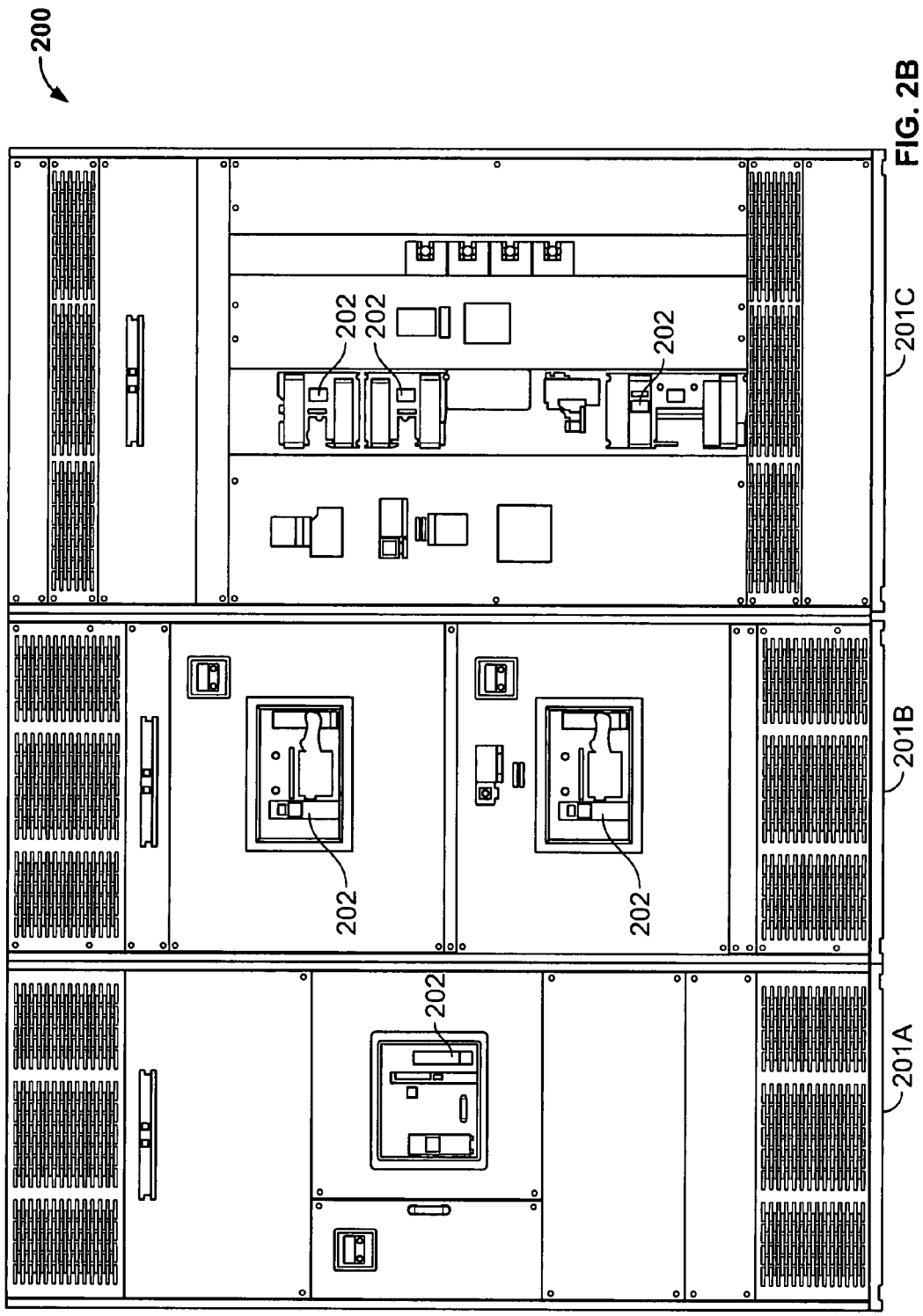
FIG. 2B is a planar view illustrating a physical implementation of the web-enabled electrical power equipment system of FIG. 2A.

FIGS. 2A and 2B illustrate a web-enabled electrical power equipment system 200 that includes a temperature sensor in accordance with the embodiment described above in reference to FIG. 1. The electrical system 200 includes three panelboards 201A-201C in which various electrical components are mounted. Each of the panelboards 201A-201C includes one or more circuit breakers 202 that are electrically connected to a power load via a plurality of power conductors 204. Although, for clarity, only some of the circuit breakers 202 are illustrated as being connected to power conductors 204, it is noted that any of the circuit breakers 202 can be connected to respective power conductors 204.

The circuit breakers 202 are communicatively coupled via data conductors 206 to a server 208, which can be a central communications processor. The server 208 communicates with a customer network to send and/or receive data messages related to the circuit breakers. As described above in reference to FIG. 1, the data messages can include information related to temperature monitoring of conductor connections of the circuit breakers 202. The electrical system 200 optionally includes one or more plug-in modules 210 for communicatively coupling circuit breaker 202 from one of the panelboards 201A-201C with circuit breakers 202 from another one of the panelboards 201A-201C. The plug-in modules 210 are mounted in-between adjacent ones of the panelboards 201A-201C.

Although the electrical system 200 is described as including panelboards 201A-201C, in alternative embodiments the electrical system 200 can include other electrical distribution equipment instead of or in addition to a panelboard. For example, an electrical distribution equipment system can include one or more of a switchgear, a switchboard, a control panel, a busway, and a motor control center.

While particular embodiments, aspects, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A circuit breaker comprising:
 a breaker enclosure containing internal components that include a trip unit;
 a plurality of conductor connections for electrically coupling the trip unit to a plurality of power conductors;
 a temperature sensor located to sense heat radiated by the conductor connections, the temperature sensor being positioned inside the enclosure and proximate to the plurality of conductor connections; and
 a controller communicatively coupled to the temperature sensor, the controller being programmable to determine defective conditions of the conductor connection by distinguishing between a normal temperature increase due to higher load currents and an abnormal temperature increase characteristic of defective conductor connection.

2. The circuit breaker of claim 1, wherein the temperature sensor is selected from a group consisting of an analog temperature sensor and a digital temperature sensor.

3. The circuit breaker of claim 1, wherein one or more of the plurality of conductor connections is selected from a group consisting of a screw-type lug, a compression lug, and a plug-in connection.

4. The circuit breaker of claim 1, further comprising another temperature sensor.

5. The circuit breaker of claim 1, wherein the controller is communicatively coupled to the temperature sensor via an analog-to-digital channel.

6. The circuit breaker of claim 1, further comprising a memory for storing temperature values, the memory being communicatively coupled to the controller.

7. The circuit breaker of claim 1, wherein the controller is further programmable to send at least one of a trip instruction to the trip unit and a warning message to an end user.

8. A method of providing a circuit breaker for sensing temperature at a conductor connection, the method comprising:
 enclosing internal components of a circuit breaker with a protective breaker enclosure, the internal components including a trip unit;
 providing a plurality of conductor connections for electrically coupling the trip unit to a plurality of power conductors;
 mounting the temperature sensor inside the protective breaker enclosure to sense heat radiated by the conductor connections; and
 determining defective conditions by distinguishing between a normal temperature increase due to higher load currents and an abnormal temperature increase characteristic of a defective conductor connection.

9. The method of claim 8, further comprising mounting a second temperature sensor inside the protective breaker enclosure to sense heat radiated by the conductor connections.

10. The method of claim 8, further comprising communicatively coupling the temperature sensor to a controller.

11. The method of claim 8, further comprising retrieving temperature values from a memory communicatively coupled to a controller.

12. The method of claim 8, further comprising sending at least one of a trip instruction to the trip unit and a warning message to an end user.

13. An electrical system comprising:
 an electrical distribution equipment system;
 a server mounted in the electrical distribution equipment system and communicatively coupled to a customer network, the server including a processor programmable to determine defective conditions of at least one breaker lug by distinguishing between a normal temperature increase due to higher load currents and an abnormal temperature increase characteristic of a defective breaker lug connection; and
 a plurality of circuit breakers mounted in the electrical distribution equipment system and communicatively coupled to the server, each of the plurality of circuit breakers being electrically coupled to a plurality of power conductors, at least one circuit breaker of the plurality of circuit breakers including
  the at least one breaker lug for electrically coupling the at least one circuit breaker to a corresponding power conductor of the plurality of power conductors, and the at least one temperature sensor being positioned inside the at least one circuit breaker and proximate to the at least one breaker lug.

14. The electrical system of claim 13, wherein each of the plurality of circuit breakers is communicatively coupled to an adjacent one of the plurality of circuit breakers.

15. The electrical system of claim 13, wherein the server includes a central communications processor, the processor including a memory for storing temperature values detected by the at least one temperature sensor.

16. The electrical system of claim 13, wherein the electrical distribution equipment system includes at least one of a switchgear, a switchboard, a panelboard, a control panel, a busway, and a motor control center.

* * * * *